Aug. 26, 1924.
A. WILSON ET AL
1,506,211
HAM BOILER
Filed Nov. 23, 1923
3 Sheets-Sheet 1
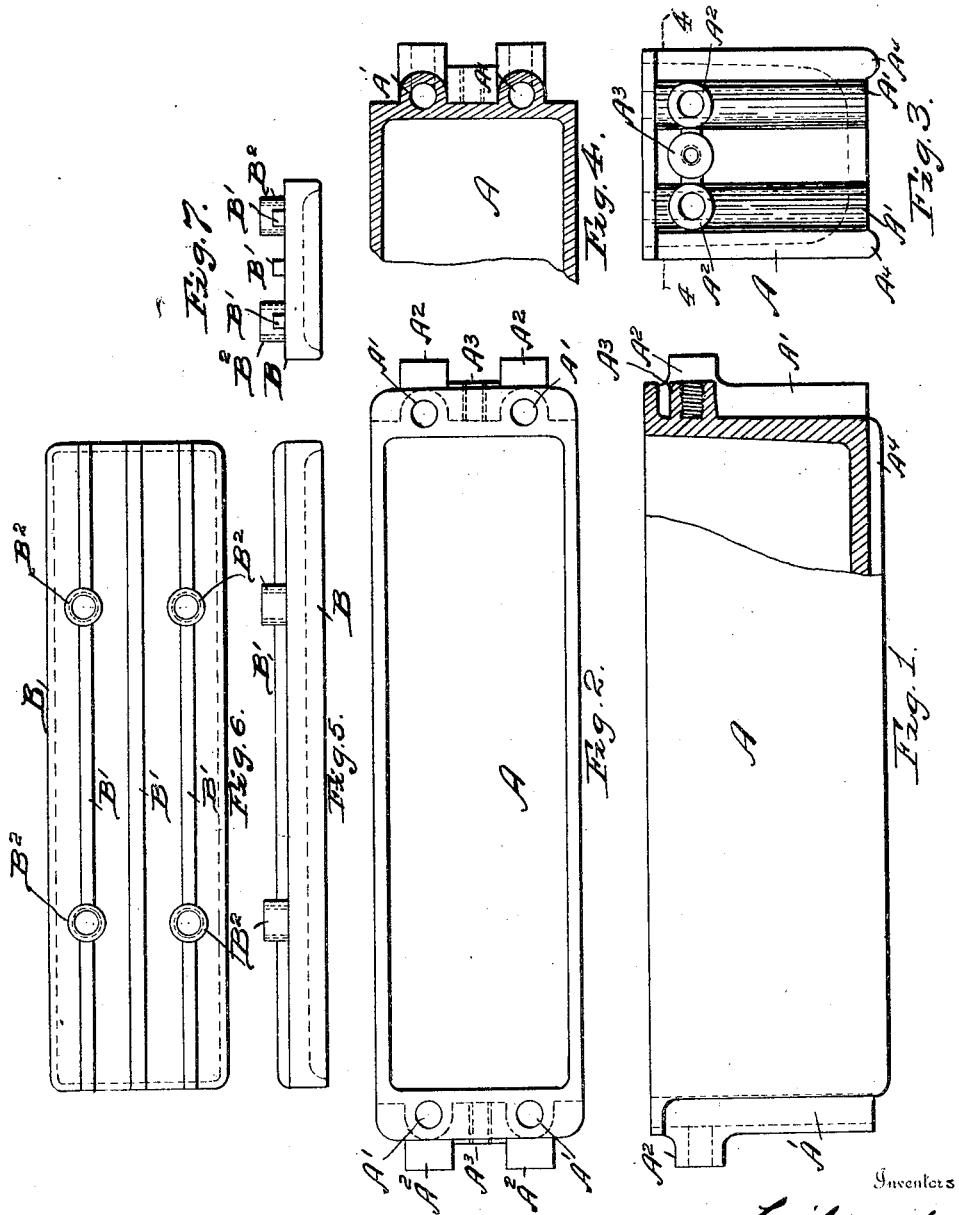
Inventors
Alexander Wilson
James Wilson
Andrew E. Wilson
By J. E. Thomas Attorney

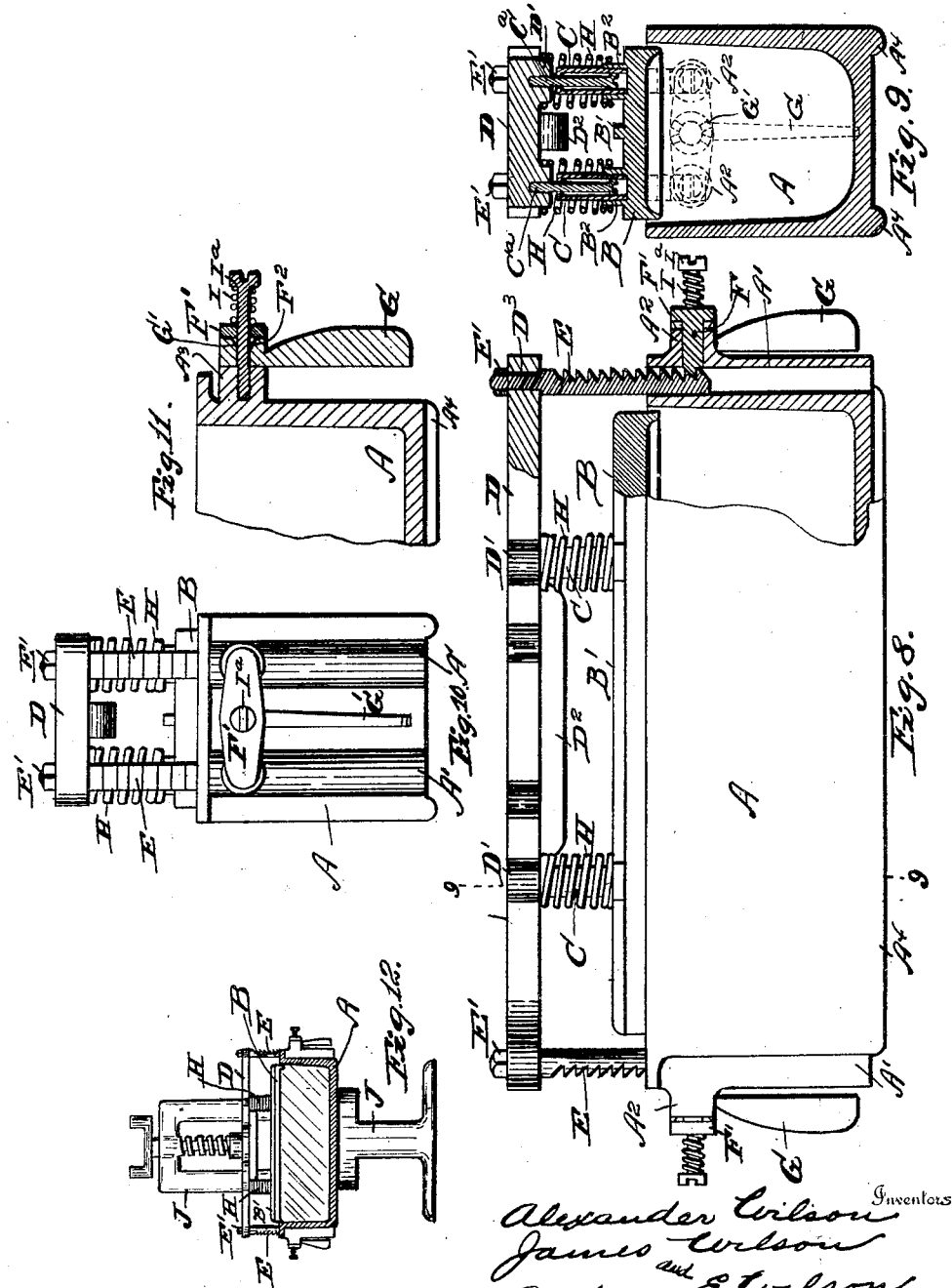

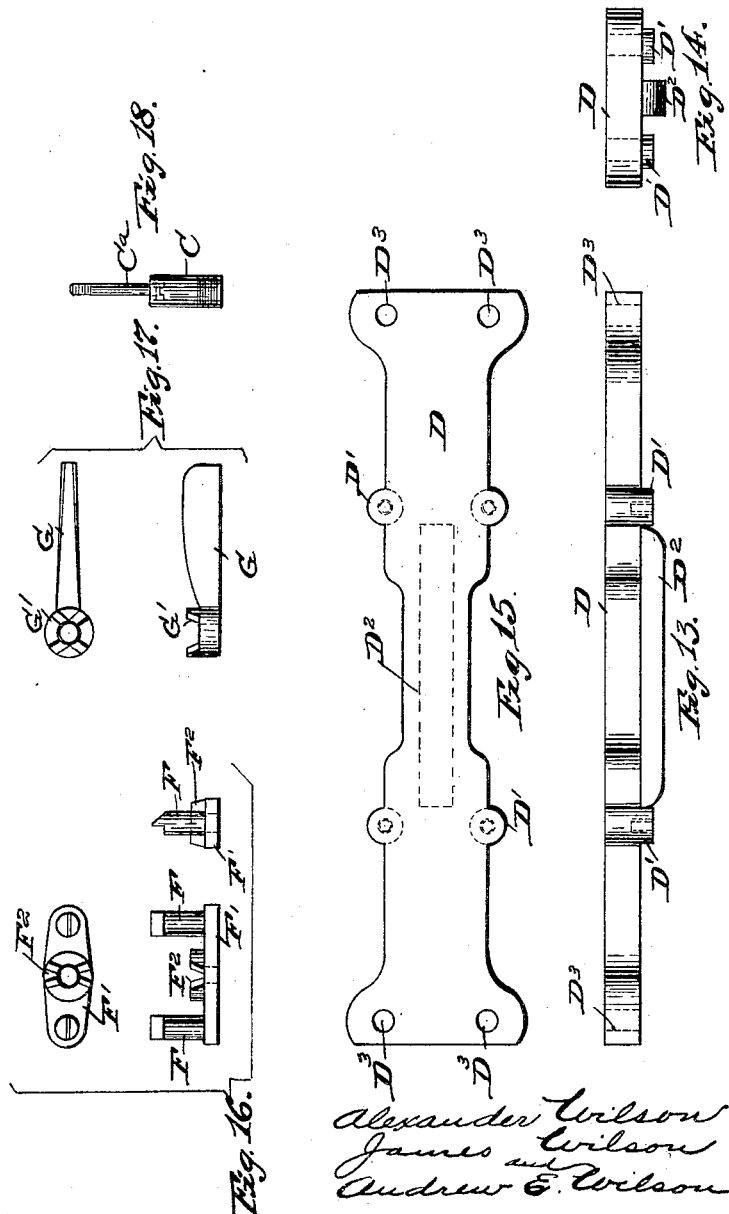

Patented Aug. 26, 1924.

1,506,211

UNITED STATES PATENT OFFICE.

ALEXANDER WILSON, JAMES WILSON, AND ANDREW E. WILSON, OF DETROIT, MICHIGAN.

HAM BOILER.

Application filed November 23, 1923. Serial No. 676,508.

*To all whom it may concern:*

Be it known that we, ALEXANDER WILSON, JAMES WILSON, and ANDREW E. WILSON, citizens of the United States, residing at Detroit, county of Wayne, State of Michigan, have invented a certain new and useful Improvement in Ham Boilers, and declare the following to be a full, clear, and exact description of the same, such as will enable others skilled in the art to which it pertains to make and use the same, reference being had to the accompanying drawings, which form a part of this specification.

Our invention relates to a meat cooking appliance shown in the accompanying drawings and more particularly described in the following specification and claims.

One of the objects of this invention is to construct a boiler for cooking ham, pork loins, or the like which may be used for home cooking but is especially designed for cafeterias or restaurants,—the construction being such that the meat when cooked is in the form of loaf which may be readily sliced for the preparation of sandwiches.

A further object of the invention is to provide yieldable means adapted to act upon the cover of the cooker whereby it may be forced into contact with the meat contained therein that it may maintain the meat in a loaf-like formation, as indicated in the drawings.

A further object of the invention is the novel means employed for automatically securing the cover to the kettle as it may be manually forced in a downward direction.

A further object of the invention is to provide means whereby the telescoping elements supporting the springs between the compressor bar and cover will not project through the pressure bar to injure the hands of the cooker.

A further object of the invention is to provide a construction embodying a ratchet bar and spring locking dogs for securing the cover to the kettle,—the arrangement being such that the ratchet bars and locking dogs are housed in bores provided in the wall of the cooker whereby the parts may not accidentally become unlocked through contact with the frame of the oven thereby causing the interlocking parts to disengage.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a side elevation partly in section of the cooker, with the cover removed.

Figure 2 is a plan view of the same.

Figure 3 is an end elevation of the cooker.

Figure 4 is a fragmentary horizontal sectional view of the cooker taken on or about line 4—4 of Figure 3.

Figures 5, 6 and 7 are plan, side and end elevations of the cover.

Figure 8 is a side elevation of the device with parts in section showing the cover secured in position by an overlapping member carrying depending ratchet bars engaged by suitable spring dogs supported in the end walls of the cooker.

Figure 9 is a vertical cross-sectional view taken on or about line 9—9 of Figure 8.

Figure 10 is an end elevation of the device as shown in Figure 8.

Figure 11 is a fragmentary detail view of one end of the cooker showing a manually operated latch member adapted to release the spring actuated dogs from the depending ratchet bars employed to secure the cover in place.

Figure 12 is a longitudinal vertical sectional view through the cooker disclosing a ham or pork loin lodged therein, the device being mounted in a suitable press, that the meat may be initially compressed upon attaching the cover to the cooker.

Figure 13 is a side elevation of the compression bar, located above the cover when assembled from which depends the ratchet bars engaged by spring actuated dogs mounted in the end walls of the cooker.

Figure 14 is an end elevation of the same.

Figure 15 is a plan view of the bar.

Figures 16 are detail views of the dogs engaging the ratchet bars.

Figures 17 are detail views of the manually operated latch for releasing the spring actuated dogs.

Figure 18 is a detail view of the thimble and bolt carried by the cover and the overhanging compression bar.

Referring now to the letters of reference placed upon the drawings:

A represents a cooking vessel which is preferably of rectangular form open at the top to receive a cover B, adapted to telescope within the chambered portion of the kettle. The cover B is provided with a plurality of longitudinal stiffening ribs B¹, and spaced from each other on the stiffening ribs are annular bosses B², threaded to receive the ends of a plurality of thimbles C.

Extending through an opening in the end of the thimble is a bolt C^a slidable therein and threaded to engage an overlapping pressure bar D, provided with depending annular bosses D¹ tapped to receive the end of the bolts. Sleeved upon the thimbles are springs H adapted to bear upon the cover B to receive the thrust of the longitudinal pressure bar. Projecting downwardly from the underside of the pressure bar D is a stiffening rib D².

Adjacent the ends of the bar D are a plurality of apertures D³ spaced apart to respectively receive a plurality of downwardly extending ratchet bars E;—the ratchet bars being provided with a shoulder bearing against the underside of the pressure bar so that when engaged by the nuts E¹ screwed thereon the ratchet bars will be fixably secured to the compression bar.

Projecting from the ends of the cooking vessel and integral with the walls of the latter are vertically disposed projections A¹, A¹, bored to receive the downwardly projecting ratchet bars E.

Extending horizontally from the projections A¹, A¹, are bosses A² respectively bored to receive a pair of spring actuated dogs F coupled together by a transverse member F¹ integral therewith.

On the face of the transverse member F¹ is a cam-shape projection F² adapted to coordinate with the cam-shaped hub G¹ of the latch G whereby upon manually swinging the latch in either direction the spring actuated dogs F engaging the ratchet bars E will be forced out of engagement with the latter. I, denotes a spring sleeved upon a bolt I^a extending through the member F, and engaging the tapped hub A³ integral with and projecting from the end of the kettle (see Figures 1, 2 and 11) for actuating the dogs.

J, indicates a suitable press (forming no part of this invention) adapted to receive the device upon inserting the meat in the kettle that the meat may be compressed by the cover when the latter is forced into telescopic relation with the kettle,—prior to preparing the meat for cooking.

Projecting downwardly from the bottom of the kettle are ribs A⁴ to maintain the floor of the kettle in spaced relation to the bottom of the vessel in which the meat is boiled or otherwise cooked.

Having now indicated the several parts by reference letters the construction and operation of the device will be readily understood.

The bones are first removed from the ham or other meat:—the meat is then forced into the kettle and the cover placed in position with the compression bar above. The device is then taken to a suitable press which acting upon the pressure bar forces the latter downwardly with the cover overlapping and bearing upon the meat,—the natural expansion of the springs serving to assist in compressing the meat into a compact mass. Upon the press having forced the compression bar downwardly practically to the limit of the movement of the bar the spring actuated dogs at each end of the kettle will automatically engage the respective rack bars thereby retaining the pressure bar against release. The device is then removed to a kettle containing water for cooking. As the meat cooks it will shrink,—the expansion of the spring however located between the pressure bar and cover will be sufficient to force the cover to follow the meat as the latter contracts producing a compact loaf which is particularly desirable for slicing for sandwiches or other purposes.

Having thus described our invention what we claim is:

1. In a device of the character described, a kettle provided with a plurality of channels extending downwardly through the walls of the latter, with openings at right angles to the channels to receive and house a plurality of dogs; a telescoping cover for the kettle; a pressure bar having a plurality of ratchet bars fixably secured thereto, adapted to enter the channels provided in the kettle; a plurality of spring actuated dogs adapted to engage the ratchet bars respectively housed in the openings formed in the kettle walls connected with the channels; means for manually releasing said spring actuated dogs from engagement with the ratchet bars; a plurality of springs located between the pressure bar and the cover and means for supporting and guiding the springs.

2. In a device of the character described, a kettle provided with a plurality of channels extending downwardly through the walls of the latter, with openings at right-angles to the channels to receive and house a plurality of dogs; a telescoping cover for the kettle; a pressure bar with a plurality of ratchet bars bolted thereto adapted to enter the channels provided in the kettle; a plurality of spring actuated dogs arranged in pairs and housed in the openings formed in the kettle walls, adapted to engage the ratchet bars; manually swinging latches provided with cam-shaped projections adapted to engage a cam-shaped projection carried by the spring actuated dogs, whereby upon operating the swinging latches the dogs may be released from engagement with the ratchet bars; a plurality of thimbles and bolts telescoping therewith, respectively connected with the cover and with the pressure bar; and a plurality of springs sleeved upon the thimbles between the pressure bar and cover adapted to force the cover into intimate contact with the contents of the kettle.

3. In a device of the character described, a kettle provided with a plurality of channels extending downwardly through the end walls of the latter, with holes bored at right angles to the channels to receive and house a plurality of dogs; a telescoping cover for the kettle; a pressure bar having a plurality of ratchet bars extending downwardly into the channels provided in the walls of the kettle; a plurality of spring-actuated dogs to engage the ratchet bars supported in said holes and connected together in pairs by cross-members having a cam-shaped projection; manually swinging latches provided with cam-faced hubs respectively adapted to coordinate with the cam-shaped projections of the spring actuated dogs, whereby upon operating the latches the dogs may be released from engagement with the ratchet bars; a plurality of springs located between the pressure bar and the cover and telescoping means respectively connected with the pressure bar and with the cover for supporting and guiding said springs.

4. In a device of the character described, a rectangular shaped kettle provided with a plurality of channels extending downwardly through the end walls of the latter with openings through the channel walls at right angles thereto to receive and house a plurality of dogs; a telescoping cover for the kettle provided with longitudinal stiffening ribs; a pressure bar having a plurality of ratchet bars bolted thereto adapted to enter the channels provided in the kettle, said pressure bar also having longitudinally arranged stiffening ribs; a plurality of spring actuated dogs arranged in pairs adapted to engage the ratchet bars, said dogs being respectively housed in the openings in the walls extending into the channels; means for manually releasing said spring actuated dogs from engagement with the ratchet bars; a plurality of springs located between the pressure bar and the cover; and telescoping means respectively connected with the bar and with the cover to support and guide the springs.

In testimony whereof, we sign this specification in the presence of two witnesses.

ALEXANDER WILSON.
JAMES WILSON.
ANDREW E. WILSON.

Witnesses:
J. B. HINSBERG,
C. GRISMER.